Patented July 18, 1933

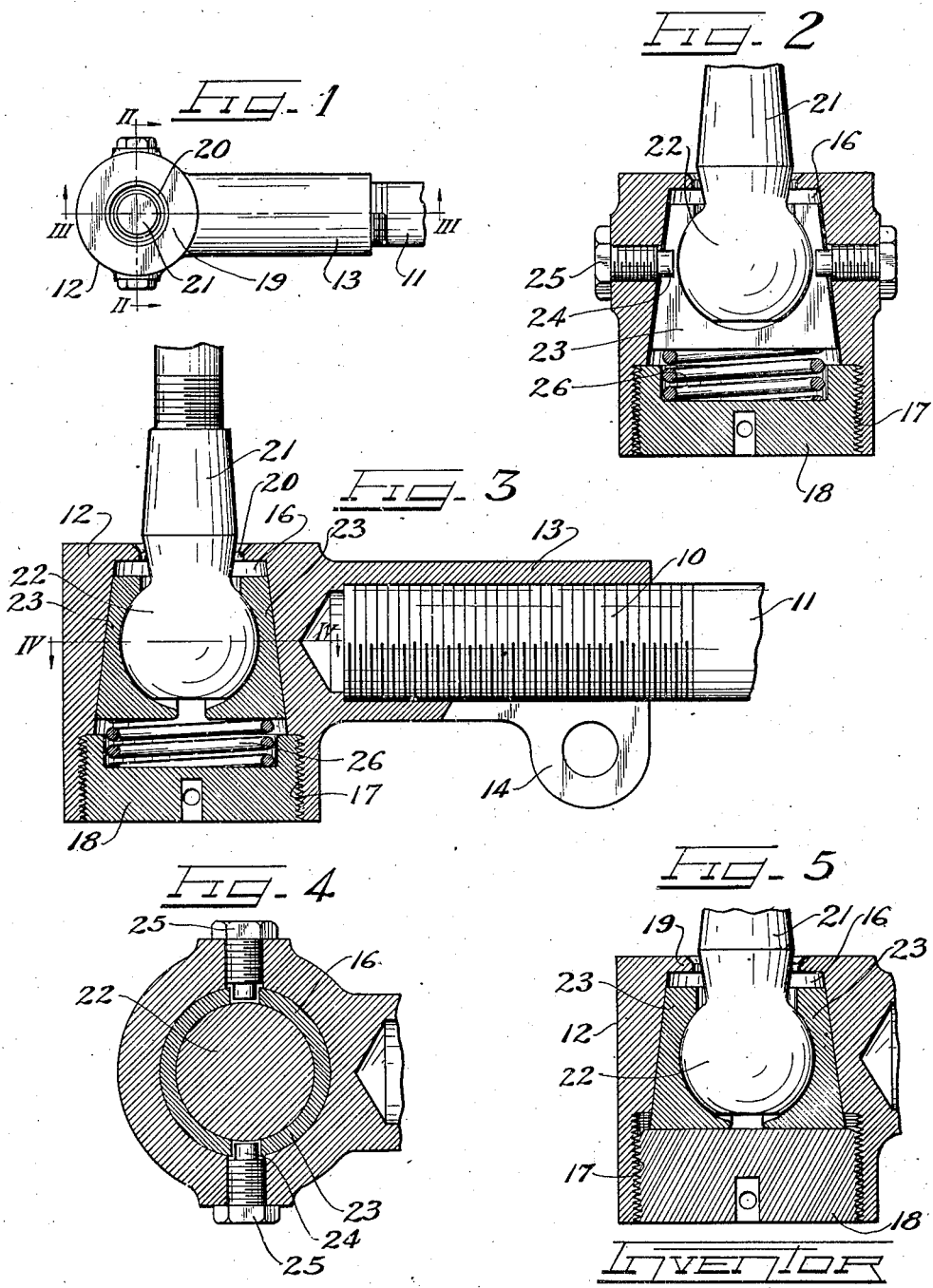

1,918,394

UNITED STATES PATENT OFFICE

GEORGE H. HUFFERD, FREDERICK C. CRAWFORD, AND MATTHEW P. GRAHAM, OF DETROIT, MICHIGAN, ASSIGNORS TO THOMPSON PRODUCTS, INC., OF CLEVELAND, OHIO, A CORPORATION OF OHIO

TIE ROD BALL JOINT

Application filed December 24, 1927. Serial No. 242,339.

This invention relates to improved form of adjustable ball joint connection for the tie rods and drag links used in the steering mechanisms of automotive vehicles.

The general object of this invention is to provide an improved adjustable ball joint connection that is compact, simple, safe and durable, and easily assembled and cheaply manufactured.

It is also an object of this invention to provide an improved form of ball joint connection wherein the ball seats are formed with outer conical surfaces seating within a conical housing so that axial alignment of the ball and housing is maintained throughout the range of longitudinal movement of the ball seats, thus maintaining the original alignment of the steering wheels.

It is another object of this invention to provide an improved and simplified form of ball joint connection wherein an automatic adjustment for wear is provided, the form of adjustment being such that failure of the spring cannot result in release of the ball.

Other and further important objects of this invention will be apparent from the disclosures in the specification and the accompanying drawing.

This invention (in a preferred form) is illustrated in the drawing and hereinafter more fully described.

On the drawing:

Figure 1 is a plan view of a ball joint connection embodying the features of this invention.

Figure 2 is an end section on the line II—II of Figure 1.

Figure 3 is an end section on the line III—III of Figure 1.

Figure 4 is a section on the line IV—IV of Figure 3.

Figure 5 is a section of a modified form of the invention.

As shown on the drawing:

The threaded end 10 of a tie rod 11 is shown in the drawing in connection with a cylindrical housing 12 having a threaded sleeve 13 engaging the tie rod, the end of the sleeve being split and provided with lugs 14 for a clamping bolt (not shown) which can be loosened to permit adjustment of the tie rod.

The housing 12 is formed as a vertical cylinder having a central conical bore 16 terminating at the bottom in a threaded opening 17 which receives a sealing plug 18. The conical bore 16 ends short of the top of the cylinder leaving an integral shoulder 19 around a smaller aperture 20 just sufficient to admit the shank 21 of a ball stud, the ball end 22 of which is positioned within the cylinder.

The ball 22 rests between the hardened ball seat members 23 comprising inner semispherical surfaces bearing on the ball and outer frusto conical surfaces, fitting within the conical bore of the housing, the two ball seat members being spaced apart to receive therebetween the ends 24 of set screws 25 threaded through the side wall of the housing. The particular form of these set screws or pins is not important; what is desired is to prevent rotation of the ball seat members, which would shift the bearing surfaces which are intended to be aligned with the thrust of the tie rod.

The foregoing description applies equally to both illustrated embodiments of this invention. In Figure 5 the plug 18 bears against the bottom of the ball seat members and adjustment or screwing in of the plug forces the ball seat members upwardly in the conical bore to take up any looseness in the bearing.

In Figures 2 and 3 a coil spring 26 is interposed between the plug 18 and the ball seat members 23, this spring providing an automatic take-up which maintains the bearing surfaces in proper contact regardless of wear while at the same time eliminating the possibility of excessive manual adjustment that would bind the bearing.

The ball joint connection is assembled by placing the ball seats about the ball and sliding the whole assembly into the housing from the bottom, the shank of the ball stud passing through the hole in the top of the housing and is then assembled with the steering arm, so that the housing cannot drop off the ball stud under any conditions of service.

It will thus be seen that we have provided an improved and simplified form of ball joint connection that will be simple and cheap to manufacture and will be safe and durable in service.

We are aware that many changes may be made, and numerous details of construction may be varied through a wide range without departing from the principles of this invention, and we, therefore, do not purpose limiting the patent granted hereon, otherwise than necessitated by the prior art.

We claim as our invention:

1. A ball joint connection comprising a ball stud with a shank smaller than the ball, a housing having a conical bore with an aperture in the top sufficient to admit the shank of the ball stud, peripherally spaced ball seat members in said housing having frusto-conical outer surfaces fitting within said conical bore, and means for longitudinally shifting said ball seat members to compensate for wear.

2. A ball joint connection comprising a ball stud with a shank smaller than the ball, a housing having a conical bore with an aperture in the top sufficient to admit the shank of the ball stud, peripherally spaced ball seat members in said housing having frusto conical outer surfaces fitting within said conical bore, a threaded plug sealing the bottom of said housing below said ball seat members, and means for longitudinally shifting said ball seat members to compensate for wear.

3. A ball joint connection comprising a ball stud with a shank smaller than the ball, a housing having a conical bore with an aperture in the top sufficient to admit the shank of the ball stud, peripherally spaced ball seat members in said housing having frusto-conical outer surfaces fitting within said conical bore, a threaded plug seating in said housing below said conical bore and a resilient member interposed between said plug and the bottom of said ball seat members.

4. A ball joint connection comprising a ball stud, a housing therefor having a tapered inner surface, complementary tapered ball seat members in said housing peripherally spaced about the ball of said ball stud and slidable upon the inner surface of said housing, and means wholly within said housing for adjusting said ball seat members.

5. A ball joint for tie rods, comprising a housing having a frusto-conical inner wall forming a bore open at its large end and provided with an inturned flange at its smaller end to define a restricted opening, a ball stud having a substantially spherical ball within said housing, the shank of said stud extending through said restricted opening, ball seat members disposed between said ball and the inner wall of said housing and spaced circumferentially about said ball, said seat members having segmental spherical inner bearing surfaces engaging the ball surface and frusto-conical outer surfaces in slidable contact with the inner wall of said housing, a closure for the larger open end of said bore and a spring disposed under compression between said closure and the bases of said seat members to urge said seat members toward the flanged smaller end of said bore and thereby automatically compensate for wear between bearing surfaces.

6. A ball joint for tie rods, comprising a housing having a frusto-conical inner wall forming a bore open at its large end and provided with an inturned flange at its smaller end to define a restricted opening, a ball stud having a substantially spherical ball within said housing, the shank of said stud extending through said restricted opening, ball seat members disposed between said ball and the inner wall of said housing and spaced circumferentially about said ball, said seat members having segmental spherical inner bearing surfaces engaging the ball surfaces and frusto-conical outer surfaces in slidable contact with the inner wall of said housing, means extending into the spaces between said seat members to prevent relative rotation thereof with respect to said housing, a closure for the larger open end of said bore and a spring disposed under compression between said closure and the bases of said seat members to urge said seat members toward the flanged smaller end of said bore and thereby automatically compensate for wear between bearing surfaces.

7. In a ball and socket joint, a casing at the end of a connecting rod, the casing interiorly having bearing surface portions converging along straight lines, bearing seats within the casing for engaging a ball therebetween and bearing respectively against said converging bearing surface portions, and means normally active for maintaining the seats against the ball and converging bearing surface portions, said bearing seats spaced apart and freely mounted relative to each other for contact with the bearing surface portions.

8. A device of the class described, comprising a casing having generally conical inner walls, said casing being disposed on the end of a connecting rod, bearing seats disposed within said casing and having conforming outer surfaces in bearing engagement with said casing inner walls, said bearing seats being adapted to journal a member therebetween, and means normally active for maintaining said bearing seats against said casing inner walls and against said member, said bearing seats being spaced apart and freely mounted relative to each other.

9. In a ball and socket joint, a casing at the end of a connecting rod having inner bearing surface portions converging along straight lines, bearing seats within said casing for engaging a ball therebetween and bearing respectively against said converging bearing surface portions, and automatic means for urging said seats toward the apex of the angle of convergence of said bearing surface portions, said bearing seats being spaced apart and freely mounted relative to each other.

10. In a ball and socket joint construction, the combination of a housing member having an opening therethrough, a ball member positioned within the opening of said housing member, a shank on said ball member extending through one end of the opening of said housing member, a pair of socket members in said opening and embracing opposite sides of said ball member, bearing portions within the opening of said housing member and having surfaces converging toward the axis of said shank of said ball member, closure means for the other end of the opening of said housing member and automatic means acting in conjunction with said convergent surfaces to urge said socket members snugly against said ball member.

GEORGE H. HUFFERD.
FREDERICK C. CRAWFORD.
MATTHEW P. GRAHAM.